United States Patent
Yavatkar et al.

(10) Patent No.: US 6,973,488 B1
(45) Date of Patent: Dec. 6, 2005

(54) PROVIDING POLICY INFORMATION TO A REMOTE DEVICE

(75) Inventors: Rajendra S. Yavatkar, Portland, OR (US); David M. Durham, Hillsboro, OR (US); Russell J. Fenger, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,916

(22) Filed: Mar. 31, 2000

(51) Int. Cl.[7] .............................................. G06F 15/16
(52) U.S. Cl. ...................... 709/223; 709/224; 709/225
(58) Field of Search ............................... 709/223–225, 709/220, 202; 370/257; 376/224

(56) References Cited

U.S. PATENT DOCUMENTS

| | | | |
|---|---|---|---|
| 5,751,967 A | | 5/1998 | Raab et al. |
| 6,167,445 A * | | 12/2000 | Gai et al. ................... 709/223 |
| 6,170,009 B1 * | | 1/2001 | Mandal et al. ............. 709/223 |
| 6,230,200 B1 * | | 5/2001 | Forecast et al. ............ 709/226 |
| 6,243,747 B1 * | | 6/2001 | Lewis et al. ................ 709/220 |
| 6,393,474 B1 * | | 5/2002 | Eichert et al. .............. 709/223 |
| 6,415,323 B1 * | | 7/2002 | McCanne et al. ........... 709/225 |
| 6,425,005 B1 * | | 7/2002 | Dugan et al. ............... 709/223 |
| 6,445,682 B1 * | | 9/2002 | Weitz ......................... 370/257 |
| 6,470,384 B1 * | | 10/2002 | O'Brien et al. ............. 709/223 |
| 6,505,244 B1 * | | 1/2003 | Natarajan et al. .......... 709/223 |
| 6,539,425 B1 * | | 3/2003 | Stevens et al. ............. 709/220 |
| 6,601,082 B1 | | 7/2003 | Durham et al. |
| 6,615,218 B2 * | | 9/2003 | Mandal et al. ............. 709/224 |
| 6,684,244 B1 * | | 1/2004 | Goldman et al. ........... 709/223 |
| 6,704,319 B1 | | 3/2004 | Durham et al. |
| 6,748,416 B2 * | | 6/2004 | Carpenter et al. .......... 709/202 |
| 6,751,659 B1 | | 6/2004 | Fenger et al. |
| 6,760,761 B1 * | | 7/2004 | Sciacca ....................... 709/220 |
| 6,765,864 B1 * | | 7/2004 | Natarajan et al. ........... 370/224 |
| 6,816,903 B1 * | | 11/2004 | Rakoshitz et al. .......... 709/226 |
| 2003/0115246 A1 | | 6/2003 | Mahon et al. |

* cited by examiner

*Primary Examiner*—Marc D. Thompson
(74) *Attorney, Agent, or Firm*—Fish & Richardson P.C.

(57) ABSTRACT

Policy information is distributed to remote network devices by mapping high-level policy information into low-level configuration information and distributing the low-level configuration information to the remote network devices.

24 Claims, 3 Drawing Sheets

PROVIDING POLICY INFORMATION TO A REMOTE DEVICE

This invention relates to providing policy information to a remote device.

BACKGROUND

Some networks operate merely as a passive "pipe" to transport data across the network. Other networks take advantage of advanced features of network devices, such as priority, custom, and weighted fair queuing. Adding such features complicates the configuration and management of the network.

To manage network components simply and intelligently, network designers have proposed policy based network management (PBNM). PBNM manages and controls a network as a whole, so that network operations conform to the business goals of the organization that operates the network and are applied on an individual, group, role, time of day, or other basis. The PBNM serves as a backbone for the present invention.

DESCRIPTION

Figure 3:
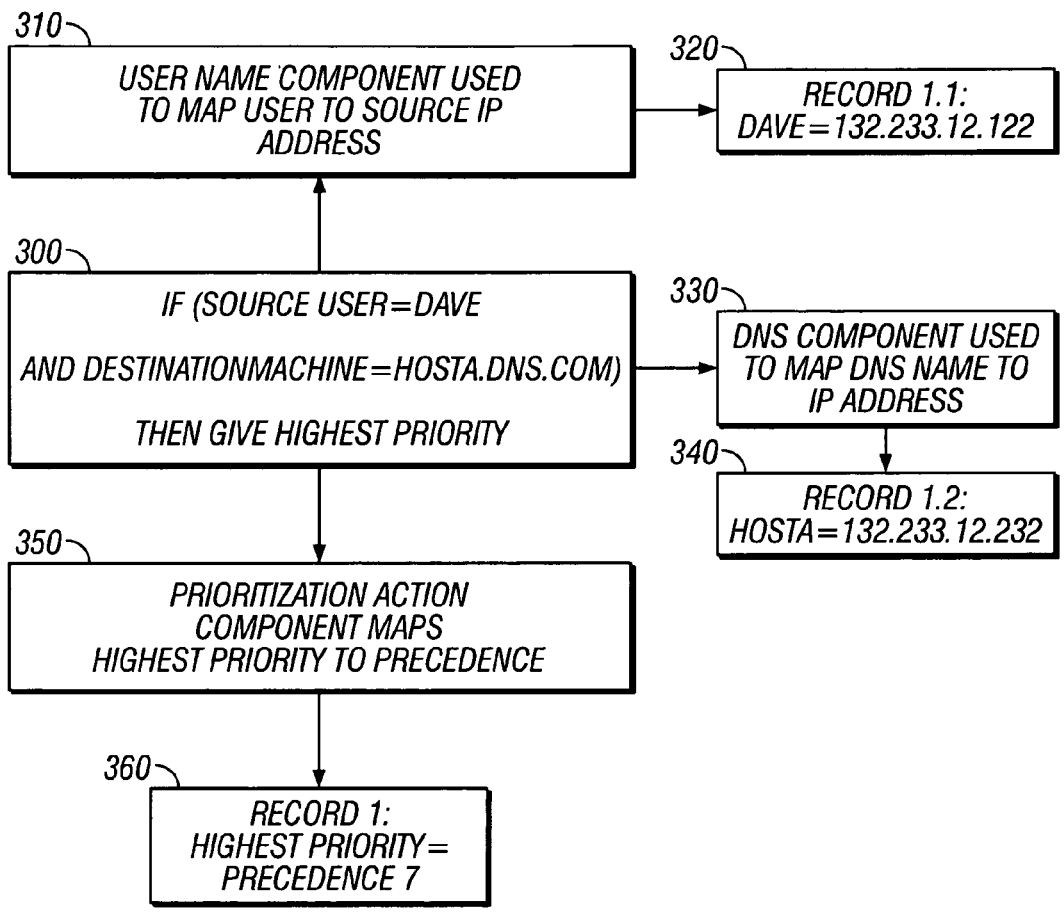
FIG. 3 illustrates how a simple high-level rule is translated into low-level configuration information.

PBNM requires enforcement of high-level policy information throughout a computer data network. High-level policy information is, for example, a condition for a user/application system to access a resource, such as bandwidth, multicasting, virtual local area networks, or security. The policy information often is parsed into policy rules having the following general format: if (condition) then (action) as seen in FIG. 3.

Figure 1:
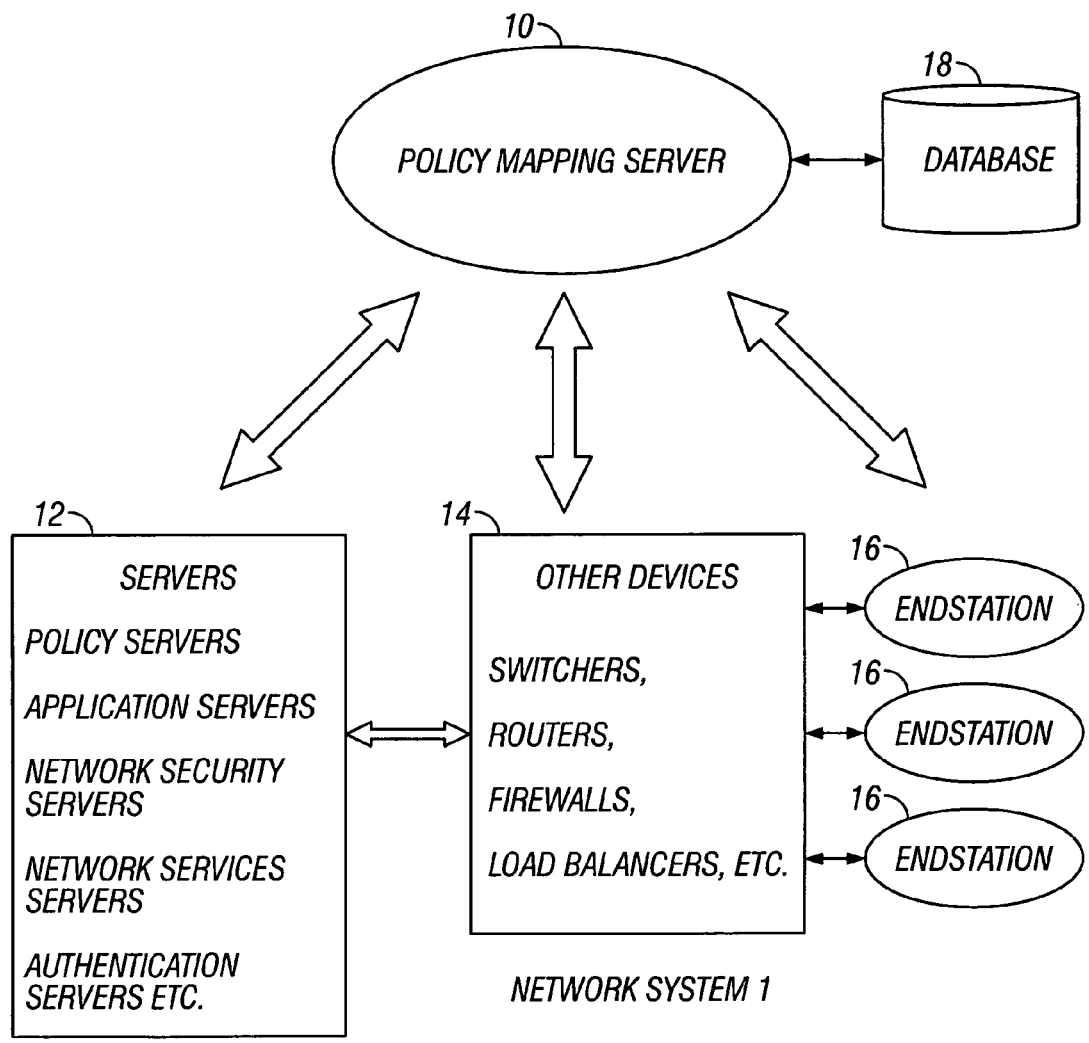
FIG. 1 illustrates a network system implementation of the invention.

As shown in FIG. 1, a network system 1 includes a hierarchy of devices including endstations 16 that interact with users. The endstations 16 also interact with other network infrastructure devices 14 that are responsible for handling, forwarding, and routing communications data. Exemplary infrastructure devices 14 include switchers, routers, firewalls, and load balancers. At higher levels of the hierarchy, the servers 12, such as application servers, network security servers, and network services servers are responsible for managing applications, users, and services available over or through the network 1. PBNM uses a policy mapping server 10 for managing the network devices 14 to carry policy information effectively over the entire network 1. The mapping server 10 may be dedicated solely for mapping high-level policy information to low-level configuration information. Alternatively, the mapping function may be a function of a general policy server that maintain, manage, and distribute policy information over the entire network 1. In the former case, the mapping server 10 may interact with other policy servers 12 to coordinate distribution of low-level configuration information.

The phrase "network devices" includes the network infrastructure devices 14, endstations 16, servers 12, and other network components.

The network's infrastructure is built on the network devices 14 that are optimized for forwarding and routing data. Typically, those devices forward and route data based on known transport fields in the network transport protocol's header. The information can include, for example, source and destination addresses, application identification information, and protocol type. The network devices 14 deal with such transport fields directly in a highly optimized fashion. However, beyond the basic data link and network, those transport fields are neither a scalable nor flexible solution to enable the network devices 14 to carry out the transportation of application specific data, to which high-level policy information is typically involved.

Thus, the servers 12 are placed strategically within the network 1 to provide an additional level of intelligence. The servers 12 can be inserted in the data paths where the data packets aggregate or where security boundaries, such as firewalls, are required. These servers 12 are capable of going beyond the static fields of network and transport protocols. For example, the servers 12 can logon users, allocate bandwidth, or search for viruses. They are implemented in a flexible way on general-purpose platforms. Furthermore, other servers 12 such as authentication servers allow users to be identified securely to applications and application servers in the network 1.

Although the network devices 14 may not provide the general-purpose services seen in the network servers 12, they can perform basic functions related to packet scheduling/forwarding (quality of service or QoS) and routing. The network devices 14 typically support configuration information called remotely modifiable filter lists that allow basic actions to be performed on data packets whose protocol fields match the filter. Also known as access control lists (ACLs), these filter/action pairs allow packets that match a filter to be acted in a specific fashion. Such actions might be a specific way to drop, reroute, or schedule the packet.

The mapping server 10 of the invention can map high-level policy information into low-level configuration information that is distributed selectively to the network devices 14 or endstations 16. The policy mapping server 10 may monitor the state of and maintain current policy information on all configured components that make up the network infrastructure such that filter/actions lists at the device level are updated rapidly when changes are made to the state of the components.

The mapping server 10 can communicate with or act as any of the network servers 12 that provide services such as Dynamic Host Control Protocol (DHCP), user logon/logoff, domain name services (DNS), QoS, and routing tables. Users, hosts, and applications interact with the mapping server 10 to access a service available on the network 1. The server 10 also can access low-level filter/action lists, in other words, low-level configuration information, of the remote network devices 14 and endstations 16. The server 10 also can change the low-level information on the network devices 14 and the endstations 16 interactively. Low-level information is updated quickly since mapping high-level information into low-level configuration information is a dynamic, on-going process. In other words, because users logon then logoff, DHCP addresses expire, and network routes change, the mapping is executed as rapidly as necessary in response to the state changes of the network components.

Typically, high-level policy information is created by a user or network administrator. State changes, such as a user logging on or off, or changes to a DHCP address name or other policy information, are communicated to the policy mapping server 10 and rapidly re-mapped to low-level configuration information that is stored in an internal database 18. That is, when the mapping server 10 detects changes in the high-level mappings, the affected mapping is performed and the new low-level configuration information is determined. The low-level configuration tables are updated on the mapping server's database 18. The mapping involves determining the low-level ACLs or filters/actions that correspond to high-level policy information mapping components, such as a username or DNS (domain naming system) name. Additionally, any further translations required to obtain the corresponding device-specific configuration also are carried out. The low-level data then is distributed to the appropriate network devices 14 or the endstations 16 to reconfigure their low-level tables. Alternatively, the mapping server 10 may can supply the low-level information to the policy server 12, which can perform the above mentioned functions.

Alternatively, the policy mapping server 10 may be limited to mapping the high-level policy information to the low-level configuration information. The rest of the functions mentioned above may be coordinated through the policy server 12, which can interact with the network devices 14, endstations 16 and other servers 12.

Examples of high-level policy information include time-based policy information, user-based policy information, application-based policy information, DNS policy information, ISPEC secured transport (address/port re-mapping), route dependent policy information, FTP (file transport protocol) port mappings, HTTP (hyper text transport protocol), and named multicast session identification. The high-level policy information can include any form of information that does not directly describe but can be mapped into the low-level form.

Examples of low-level network device configuration information include information about physical, datalink, network and transport layers such as ports, source/destination MAC (moves, adds and changes) addresses, source/destination IP (internet protocol) addresses, protocol identification, and source/destination application ports. A DNS name, for example, can map to a particular IP address for a period of time. Typically, high-level policy information specifies conditions describing DNS machine names. That information can be mapped by the policy mapping server 10 into low-level IP addresses that a network-level device can use directly in its ACLs.

Figure 2:
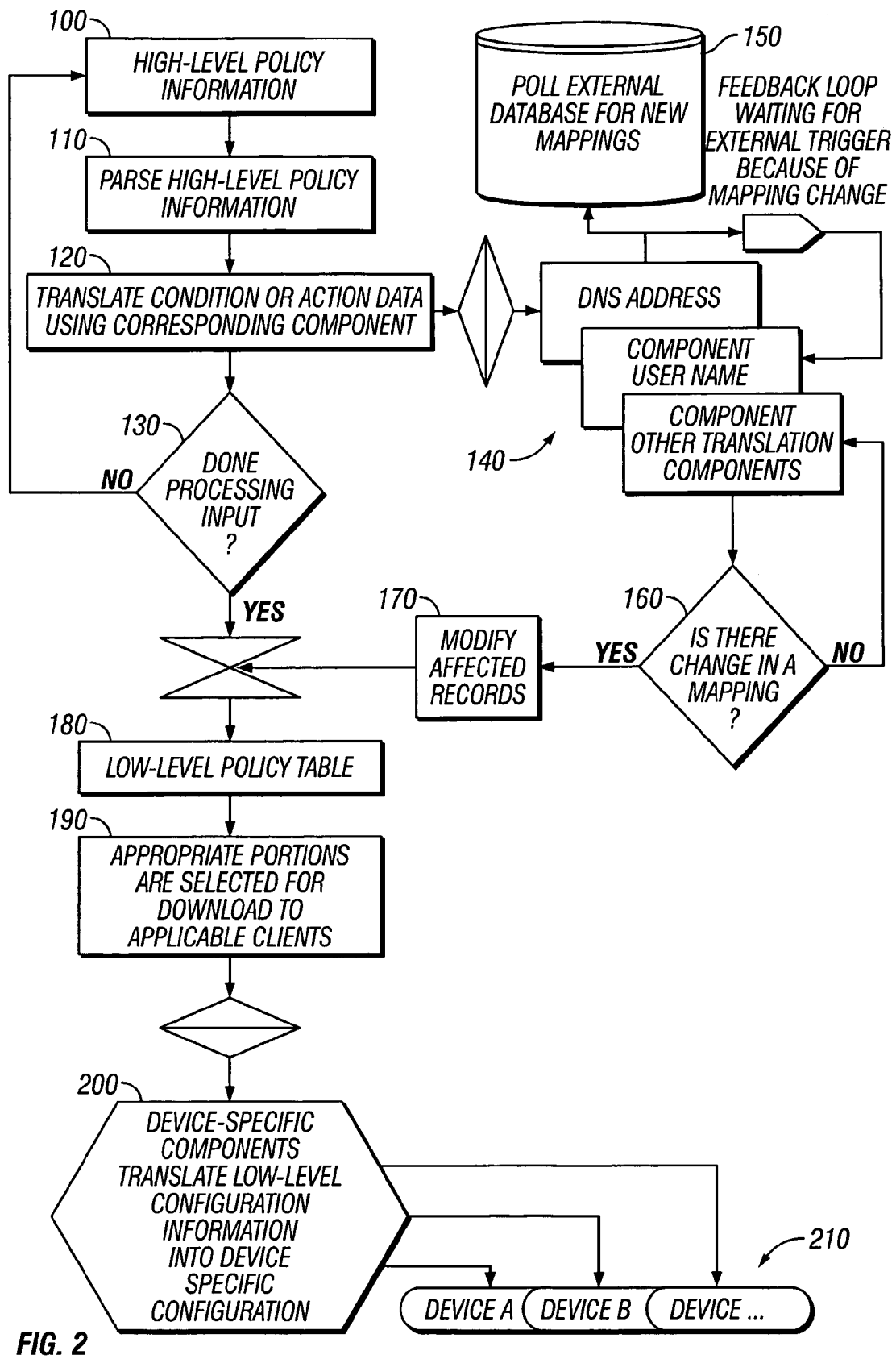
FIG. 2 illustrates a method for mapping high-level policy information to low-level configuration according to an implementation of the invention.

An algorithm of the invention that can be implemented by the policy mapping server 10 is shown in FIG. 2. High-level policy information (block 100) is parsed into a set of "if (conditions) then (action)" rules (block 110). Then the conditions and action data are translated into corresponding low-level configuration information components (block 120).

An example in FIG. 3, shows how a simple high-level rule can be translated into low-level configuration information using this mapping technique. The user name mapping component in the condition portion of the policy rule (block 300) is used to map the source's user name to a source IP address (block 310). That component is used to translate the user (Dave) into an appropriate IP address (block 320). Generally, the IP address is the IP address of the machine that the user named Dave currently is logged into. The DNS component of the condition portion of the policy rule (block 300) is used to look up the destination DNS address and translate it into an IP address for the destination of the traffic from the user (block 330). Next, the action portion of the policy rule is translated (block 300). In this example, the IP precedence is set to value 7 which indicates highest priority. The three pieces of information are stored in a record specifying the action and the two conditions under which the action is to be performed by a network device (blocks 320, 340, and 360).

As further shown in FIG. 2, once the high-level policy information has been processed (block 130), the low-level configuration information is stored in the database 18 as a table (block 180). Specific devices in the network are appropriately selected for the distribution of the low-level configuration information (Block 190). Selected devices represent applicable targets for the policy based on a direct assignment or relationships between the network components determined by the policy information. The low-level configuration information is converted into a device-specific form by a proxy component designed to interact with a particular type of low-level network device, for instance device A (block 200). The final form of the configuration information is then distributed to the selected network device A (block 210). Once the configuration information is downloaded to the network device A, it causes all data transferred from the user (Dave) directed to HostA to be given the highest priority by the network Device A.

The mapping server 10 may poll databases or wait for feedback from other servers to determine whether any mapping components of a policy rule (block 140) have changed (block 150). If the mapping components have changed (block 160), corresponding low-level information on the mapping components are updated as well (blocks 170 and 180). Devices affected by the new mapping are updated with the appropriate configuration information (blocks 190 to 210). Therefore, a highly dynamic mapping from high-level policy to low-level configuration information can be achieved.

The foregoing techniqueas can be implemented in a computer program executable on a computer. The computer program can be stored on a storage medium, such as random access memory (RAM), readable by a general or special purpose programmable computer, for mapping high-level policy information to low-level configuration information when the storage medium is read by the computer to perform functions described above.

Implementations of the invention bridge the gap between high-level services hosted by the network servers 12 and low-level device information handled by the network devices 14 or the endstations 16. It allows sophisticated high-level policy to be enforced efficiently by the low-level devices 14 throughout the network 1. An efficient and distributed architecture for controlling networks through policy information can be achieved. Furthermore, the techniques obviate the need to insert high-level policy information into the network devices 14 or to place the network servers 12 throughout the network 1. Only a few mapping servers that interact with the network's infrastructure are required to provide the desired result.

Additionally, the scalability of the architecture described above can be improved because only the appropriate low-level configuration information needs to be distributed to the selected target devices 14 or the endstations 16. Also, a hierarchy of the mapping servers 10 can be created such that scalable policy distribution can be achieved.

Other implementations are within the scope of the following claims.

What is claimed is:

1. A method of providing policy information to a remote network device, the method comprising:
   mapping high-level policy information into low-level configuration information;
   distributing the low-level configuration information to the remote network device; and
   detecting changes in high-level mappings of policy information that controls access to a network resource, said detecting changes including detecting when a user logs on to a network machine, to dynamically update the low-level configuration information based on the changes.

2. The method of claim 1 further comprising;
   translating the low-level configuration information into a device-specific form suitable for the remote network device; and
   distributing the device-specific form of the low-level configuration information to the remote network device.

3. The method of claim 1 wherein the low-level configuration information relates to control lists that allow actions to be performed on data packets having protocol fields that match the control lists.

4. The method of claim 1 further comprising: during mapping, parsing the high-level policy information into a policy rule and translating components of the policy rule into components of the low-level configuration information.

5. The method of claim 1, wherein detecting changes comprises polling for changes in policy information mapping components.

6. A communication system comprising a policy server configured to;
   receive high-level policy information that affects a remote network device;
   map the high-level policy information into low-level configuration information;
   distribute the low-level configuration information to the affected remote network device; and
   detect changes in high-level mappings of policy information that controls access to a network resource, said detecting changes including detecting when a user logs on to a network machine, to dynamically update the low-level configuration information based on the changes.

7. The system of claim 6, the policy server further configured to manage the translation of the low-level configuration information into a device specific-form of the low-level configuration information suitable for the remote network device.

8. The system of claim 6, wherein the low-level configuration information relates to control lists that allow basic actions to be performed on data packets having protocol fields match the control lists.

9. The system of claim 6, the policy server maps the high-level policy information by parsing the high-level policy information into a policy rule and translating components of the policy rule into components of the low-level configuration information.

10. The system of claim 6, the policy server configured to poll for changes in policy information mapping components when detecting changes in high-level mappings of policy information.

11. A communication system, comprising;
    a policy mapping server that maps high-level policy information associated with a network into low-level configuration information;
    a database that stores the low-level configuration information; and
    remote network devices that receive the low-level configuration information stored in the database,
    wherein the policy mapping server detects changes in high-level mappings of policy information that controls access to a network resource, said detecting changes including detecting when a user logs on to a network machine, to dynamically update the low-level configuration information based on the changes.

12. The system of claim 11, wherein the remote network devices receive low-level configuration information formatted in a device-specific form.

13. The system of claim 11, wherein the low-level configuration information relates to control lists that allow basic actions to be performed on data packets having protocol fields match the control lists.

14. The system of claim 11, wherein the policy server maps the high-level policy information by parsing the high-level policy information into a policy rule and translating components of the policy rule into components of the low-level configuration information.

15. The system of claim 11, wherein the policy mapping server interacts with other policy servers that distribute the low-level configuration information.

16. The system of claim 11, wherein the policy mapping server polls for changes in policy information mapping components when detecting changes in high-level mappings of policy information.

17. An article comprising a computer-readable medium that stores computer-executable instructions for causing a computer system to:
    map high-level policy information into low-level configuration information;
    distribute the low-level configuration information to the remote network device; and
    detect changes in high-level mappings of policy information that controls access to a network resource, said detecting changes including detecting when a user logs on to a network machine, to dynamically update the low-level configuration information based on the changes.

18. The article of claim 17, further causing the computer to:
    translate the low-level configuration information into a device-specific form suitable for the remote network device; and
    distribute the device-specific form of the low-level configuration information to the remote network device including an endstation.

19. The article of claim 17, wherein the low-level configuration information relates to control lists that allow basic actions to be performed on data packets having protocol fields that match the control lists.

20. The article of claim 17, further causing the computer to map the high-level policy information by parsing the high-level policy information into a policy rule and translating components of the policy rule into components of the low-level configuration information.

21. The article of claim 17, further causing the computer to poll for changes in policy information mapping components when detecting changes in high-level mappings of policy information.

22. A remote network device configured to:
receive low-level configuration information formatted in a device-specific form from a policy mapping server that maps high-level policy information into the low-level configuration information;
securely identify a logged on user; and
impart changes to policy information to the policy mapping server including relating to the policy mapping server the identified, logged on user that affects high-level mappings of policy information.

23. The remote network device of claim 22, wherein securely identifying the logged on user comprises communicating with an authentication server, and the policy mapping server interacts with other policy servers that distribute the low-level configuration information.

24. The remote network device of claim 22, wherein the remote network device is further configured impart changes to policy information mapping components when polled by the policy mapping server.

* * * * *